Patented May 12, 1925.

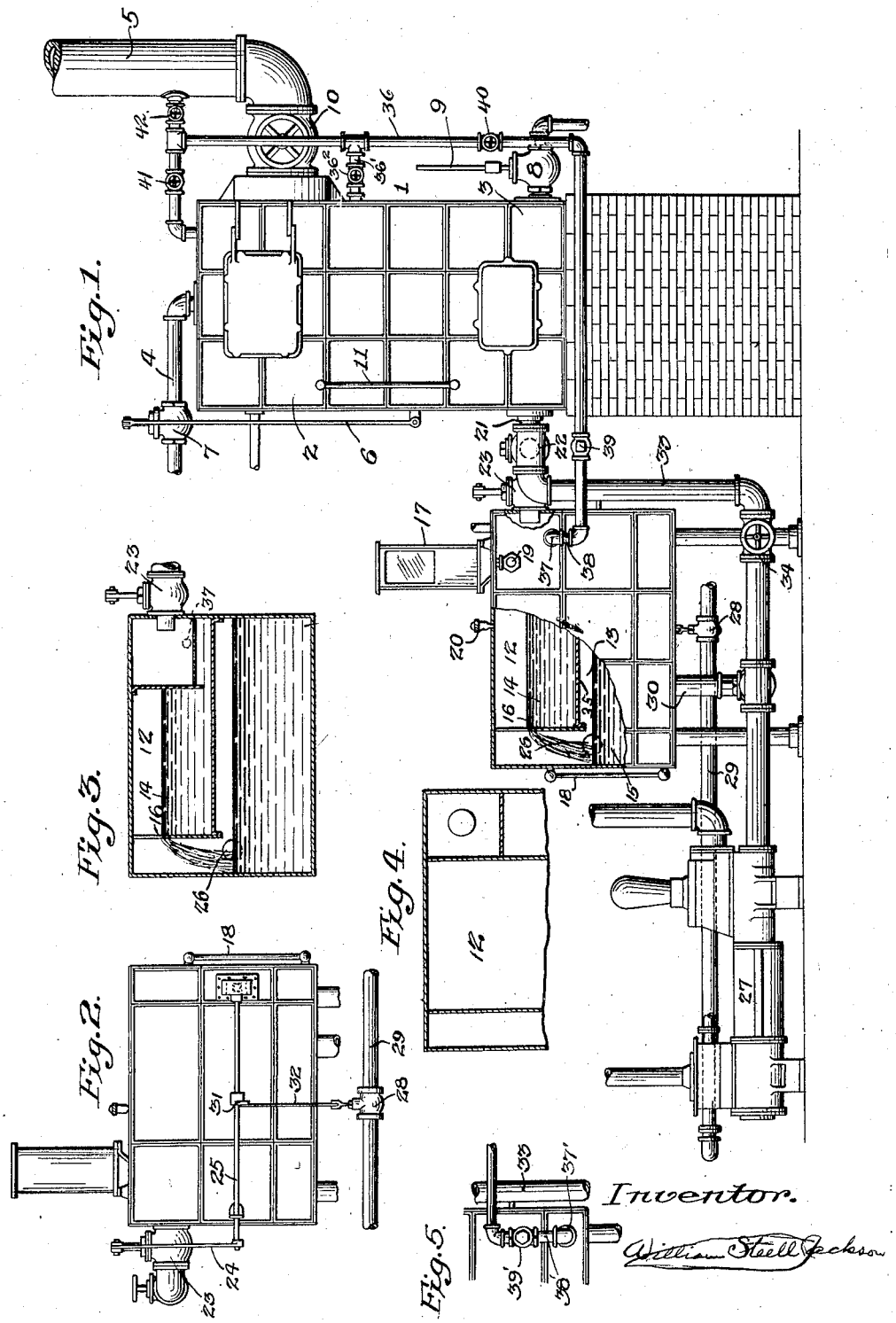

1,537,677

UNITED STATES PATENT OFFICE.

WILLIAM STEELL JACKSON, OF BALA, PENNSYLVANIA, ASSIGNOR TO YARNALL-WARING COMPANY, OF PHILADELPHIA, PENNSYLVANIA, A CORPORATION OF PENNSYLVANIA.

RETARDED HEATER AND METER CONNECTION.

Application filed June 27, 1919. Serial No. 307,157.

*To all whom it may concern:*

Be it known that I, WILLIAM STEELL JACKSON, a citizen of the United States, residing at 127 Upland Terrace, Bala, in the county of Montgomery and State of Pennsylvania, have invented a certain new and useful Retarded Heater and Meter Connection, of which the following is a specification.

My invention relates to weir meters intended to measure water or other liquid having a temperature in excess of 212° Fahrenheit.

The purpose of my invention is to secure flow of steam from the steam space of the heater or from the steam system back of the heater into the water space of the meter at pressures above the atmosphere; to slightly retard flow between the steam space of the heater or system and the water space of the meter while providing for a general conformation of pressure and temperature; to utilize the steam flow into the water in the meter for the purpose of heating and mixing the water and, where uniformity of feed water temperature is desired, to protect against counterflow of fluid when temporary conditions of vacuum or lower pressure than in the meter exist in the heater, maintaining the pressures above the atmosphere and temperatures above 212° Fahrenheit in the meter which have been obtained and reducing the fluctuations of pressure and temperature in the meter.

Further purposes of my invention will appear in the specification and the claims thereof.

I have preferred to illustrate my invention by a form thereof, which is practical, efficient and inexpensive and which at the same time well illustrates the principles thereof.

Figure 1 is a partly broken front elevation of the preferred form of my construction.

Figure 2 is a rear elevation of a portion of the construction shown in Figure 1 but upon a reduced scale.

Figure 3 is a vertical section of the meter through the inlet compartment thereof.

Figure 4 is a reduced horizontal section of the meter.

Figure 5 is a broken side elevation showing a modification.

Similar numerals of reference indicate like parts in the drawings.

Where water is available for boiler feed at a pressure above that of the atmosphere and a temperature in excess of 212° F., it is usually subject to considerable fluctuation in pressure and temperature because of the fluctuating conditions in the feed water heater. Where the pressure falls below the atmosphere at times to varying degrees of vacuum and the temperature correspondingly falls below 212° F., it is desirable to retard the flow between the heater and meter slightly but at the same time to have the pressure and temperature in the heater and meter generally correspond. But where uniformity of feed water temperature is of moment it may be desirable to secure in the meter the pressures and temperatures of the heater where these are above the atmosphere and 212° F. and to avoid lower pressures in the meter, reducing the range of pressure fluctuation there. My invention makes possible either of these and also gets the full benefit of the heating effect of any flow from the heater to the meter.

A connection between the steam space of the heater and the steam space of the meter which has been provided is objectionable because of the excessive fluctuation.

I connect the steam space of the heater or of the exhaust system back of the heater with a water space of the meter, preferably well below the water level. This can be done by connection into the meter with either of the two water spaces—within the weir chamber or within the catch basin. Each has its advantage. The connection within the weir chamber adds any water which may be condensed to the water above the weir, but requires protection to the weir chamber surface against fluctuation by reason of the inlet vapor. Connection below the catch basin water level gives greater possible depth of water over the point of inlet without disturbance of the weir surface, but with the disadvantage from theoretical standpoints at least of passing through without measurement any water which is condensed.

1 designates a feed water heater, having steam compartment 2 and water compartment 3. The feed water enters through pipe 4 and the steam system, usually exhaust, is represented by the single pipe 5. The heater contains the usual float-operated inlet water control by means of rod 6 and valve 7 and the float-controlled overflow through valve 8 moved by rod 9. A valve 10 is provided by which the inlet steam may be shut off and the water height is indicated in glass 11.

All of this heater construction is old and is selected merely as one of various forms since I must illustrate my invention in connection with some one form. The meter, per se, is also old and is for the same reason selected as illustrative of one of many forms of weir meter in connection with which my invention may be utilized. As shown, it contains the receiving chamber 12 and storage chamber 13 in which the water spaces are represented at 14 and 15 respectively. The weir is shown at 16 and a casing for float-operated recording mechanism is shown at 17. The weir chamber is provided with a gauge glass 18 and the vacuum break 19 and thermostatic valve 20.

The pipe 21 conveys the water from the feed water heater to the receiving chamber of the weir and may be provided with check valve 22 when it is desired to prevent movement of water in the reverse direction. This check valve I believe has not been used by others prior to my use of it. It in no way affects the control valve hereinafter described except as it prevents reverse flow through it.

The pipe 21 is also provided with an automatic valve 23, operated by an arm not shown, lever 24, rod 25, an arm not shown, and float 26 to control the inlet of water from the heater to the receiving chamber in reverse proportion to the height of water in the storage chamber or catch basin. I provide for control of the operation of the pump 27 also from a float, preferably from rod 25 by valve 28 within the steam pipe 29 of the pump, whereby the withdrawal of water from the water space of the storage chamber through pipe 30 is also controlled to prevent excessive lowering of the water therein.

The valve 28 is operated by the rod 25 to which it is connected by an arm 31 and rod 32. These features of automatic control of inlet and outlet are shown at more length in United States Patent No. 1,159,147, issued November 2, 1915, to David Robert Yarnall, for weir meter construction and inlet regulation.

In order to permit flow of water about the weir in emergency, a by-pass 33 is provided, controlled by any suitable valve 34.

The meter end of the connection between the heater and meter provided by my invention may be connected either within the weir chamber or within the catch basin of the weir. Where within the catch basin it can be used either with a catch basin wholly in front of the weir or with the so-called "extra storage" type of catch basin shown in Figure 1, in which case I prefer to maintain the water level in the storage or catch basin chamber below the bottom 35 of the receiving chamber.

I use a connection 36 between the steam space 2 of the heater (by pipe 36' controlled by valve 36$^2$) or the steam system 5 back of the heater and one of the water spaces of the meter, at 37' entering (Figure 5) within the storage or catch basin chamber and well below the water level maintained in the chamber within which it is placed. Any steam entering this water from the heater or steam system has a heating effect upon the water and I desire to secure this heating effect either in the water above the weir or in the water of the chamber from which pump withdrawal occurs.

Another advantage is obtained by attaching this connection at the lower part of the pool above the weir or of the catch basin water space, as the steam tends to mix the water more thoroughly than would otherwise be secured, avoiding stratification of the water with the hottest water on top and supplying somewhat warmer water for the hot well. In the illustration in Figures 1 and 3 the point 37 is selected near the end of the chamber above the weir or storage space farthest from the weir so that the water may be mixed to the best advantage; at one end by the weir flow and at the other end by the steam.

I have shown a portion of the connection 36 as vertical at 38 or 38', though it could obviously extend in any one of differing directions. I have placed a check valve 39 or 39' in the connection 36, preferably below the level of the water in the weir chamber or storage compartment so that water, and not steam, will engage the check upon the under side very quickly, in case of any tendency to reverse fluid flow in the connection 36 since the check valve may be made more sensitive to water flow than to steam flow. During some parts of the operation water may even lie against this check valve upon the under side, as when the pressure in the heater has gradually reduced, while that in the meter has not.

At any other suitable point I have inserted a hand valve 40 within the connection 36 and I have shown the connection as entering the top and side of the heater and the steam system 5, controlled by hand valves 41, 36$^2$ and 42 respectively, in order that any of these sources of steam may be utilized.

Where the steam is taken from any part of the steam system back of the heater, it should be taken from a part of the system where the oil has been separated out of the steam, or a separator for the oil should be provided.

Where the amount of possible difference in pressure by which the pressure in the meter may exceed that in the heater at times with my connection 36 operating with a check valve in it, is greater than the weight of the column of water effective upon the water inlet 21 in the heater, the use of the check valve 22 is desirable to prevent flow of steam or water from the receiving chamber of the weir to the water space of the heater.

I purpose introducing my connection 36 well below what might be called the normal low water level, meaning thereby that level which is contemplated as the lowest reached in the normal operation of the meter. I also contemplate the use of any suitable check valve, in making the connection 36 a "one way" connection where this "one way" feature is desired. The same is true of valve 22.

I recognize that each of the check valves is of advantage under certain conditions without the other; and the check valve 22 may be used advantageously to prevent vacuum conditions in the meter due to heater connection through the main water inlet, even where no connection is run from the steam space of the heater to a water space of the meter.

Though the two check valves offer some advantages for special purposes, as indicated, the connection 36 is advantageous whether either or both of the valves be used or not, presenting a damped or retarded communication between the meter and heater which keeps the two nearly equal in pressure at the same time that it prevents the rapidity of fluctuation between them which would otherwise occur.

As the water receives no heat in the meter and its passage through the meter causes a gradual cooling of the water, the average of heat and pressure in the heater will be higher than that in the meter and the retardation of flow caused by the water in the connection between will maintain a slight additional average temperature and pressure in the heater above that in the meter, without destroying the general parallelism of heat and pressure conditions in the two. The slight average additional pressure in the heater, corresponding with the higher temperature there, assists in feeding the heater water into the meter.

The connection 36 may be made large enough to allow ready fluid passage or may be reduced deliberately to throttle the communication so as to reduce the speed of fluctuation in the meter, slowing it with respect to the fluctuations in the heater, with or without the use of a check valve in this connection.

There may be advantage in being able to control the local vacuum conditions of the meter without affecting any vacuum which may exist in the heater.

Having thus described my invention, what I claim as new and desire to secure by Letters Patent is:

1. In an open feed water heater and weir meter assemblage in which the water space of the feed water heater is connected with the inlet or weir section of the meter and the feed water for boilers is withdrawn from the catch basin section of the meter, the novelty which consists in connecting the steam space of the feed water heater with one of the water spaces of the meter at a point below the water level in said water space.

2. In the invention set forth in claim 1, the novelty which consists in maintaining pressure secured within the meter casing and preventing double metering of water by placing a check valve within the connection with the water space of the meter.

3. In the invention set forth in claim 1, the novelty which consists in making the connection with the catch basin section of the meter and controlling the withdrawal of water from the catch basin through the water level therein, to maintain said water level above the point of connection.

4. In the invention set forth in claim 2, the novelty which consists in making the connection with the catch basin section of the meter and controlling the withdrawal of water from the catch basin through the water level therein, to maintain said water level above the point of connection.

5. In the invention as set forth in claim 4, the novelty which consists in connecting the steam space of the feed water heater with one of the water spaces of the meter at a point below the water level thereof.

6. In the invention as set forth in claim 5, the novelty which consists in preventing back flow of water and maintaining pressures within the meter by placing a check valve within the connection to the water space of the meter.

WILLIAM STEELL JACKSON.